(12) United States Patent
Litao (10) Patent No.: US 7,043,315 B2
(45) Date of Patent: May 9, 2006

(54) AUTOMATIC TOOL WITH DATA INTERFACE

(75) Inventor: Jonathan D. Litao, Tinley Park, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/135,904

(22) Filed: May 24, 2005

(65) Prior Publication Data

US 2005/0261798 A1 Nov. 24, 2005

Related U.S. Application Data

(60) Provisional application No. 60/573,916, filed on May 24, 2004.

(51) Int. Cl.
*G06F 19/00* (2006.01)
(52) U.S. Cl. .......................... 700/95; 700/180
(58) Field of Classification Search ................. 700/95, 700/96, 97, 99, 122, 171, 174, 180, 242
See application file for complete search history.

(56) References Cited

U.S. PATENT DOCUMENTS

| | | | |
|---|---|---|---|
| 4,472,783 A | 9/1984 | Johnstone et al. | |
| 5,388,051 A | 2/1995 | Seki et al. | |
| 6,082,577 A * | 7/2000 | Coates et al. | 221/80 |
| 6,354,336 B1 * | 3/2002 | Leban | 140/93.2 |
| 6,497,258 B1 * | 12/2002 | Flannery et al. | 140/123.6 |
| 6,788,994 B1 | 9/2004 | Nakazawa et al. | |
| 6,810,406 B1 | 10/2004 | Schlabach et al. | |
| 6,836,698 B1 | 12/2004 | Fujishima et al. | |
| 6,892,111 B1 | 5/2005 | Sakakibara | |
| 2005/0072486 A1 * | 4/2005 | Bartholomew | 140/93.2 |
| 2005/0178460 A1 * | 8/2005 | Magno, Jr. | 140/123.6 |

FOREIGN PATENT DOCUMENTS

| | | |
|---|---|---|
| GB | 2 377 070 A | 12/2002 |
| GB | 2 379 749 A | 3/2003 |
| WO | WO 2004/031875 A | 4/2004 |

* cited by examiner

*Primary Examiner*—Leo Picard
*Assistant Examiner*—Chad Rapp
(74) *Attorney, Agent, or Firm*—Robert A. McCann; Zachary J. Smolinski (57) ABSTRACT

Systems and methods enable the management and monitoring of tools in a manufacturing environment using network communications. Tools are adapted to output tool information to a network via an intermediary device. According to some embodiments, the tools are multi-part tools such as cable tie tools having a dispenser and a hand tool. A computer collects tool information, such as error information, maintenance information, and operation information, and displays the information to users as necessary to optimize maintenance and repair of the tools.

21 Claims, 10 Drawing Sheets

| Tool Serial Number | Tool Cycle Count | Disp Serial Number | Disp Cycle Count | Location | Status | COM Port |
|---|---|---|---|---|---|---|
| 01022323 | 23423 | 01053435 | 456740 | No Location | Online | 7 |
| 01022324 | 5278 | 01053436 | 745 | Room 101 | Online | 8 |
| 01022325 | 3456 | 01053437 | 45674 | No Location | Online | 9 |
| 01092322 | 345645 | 01083435 | 47643 | No Location | Online | 12 |
| 01092324 | 4566 | 01083436 | 4324576 | Room 105 | Online | 10 |
| 01092325 | 264 | 01083437 | 6552567 | No Location | Online | 11 |
| 01102345 | 23 | None | N/A | N/A | N/A | N/A |

| Number | Date | Time | Serial Number | Cycle Count | Message | Severity | Tool Serial Number | Tool Cycle Count |
|---|---|---|---|---|---|---|---|---|
| 9 | 04-28-2... | 18:51:12 | 01113140 | 870 | Tie in tool | Information | | 1802 |
| 8 | 04-28-2... | 18:25:22 | 01113140 | 870 | Tie in tool | Information | | 1802 |
| 7 | 04-28-2... | 18:25:13 | 01113140 | 870 | Low air pressure | Information | | 1802 |
| 6 | 04-28-2... | 18:23:13 | 01053437 | 45674 | Out of ties or tie in dispenser | Information | 01022323 | 23423 |
| 5 | 04-28-2... | 18:21:13 | 01053437 | 45659 | Tie in tool | Information | 01022323 | 23412 |
| 4 | 04-28-2... | 18:19:45 | 01053437 | 45634 | Jaw sensor error | Critical | 01022323 | 23322 |
| 3 | 04-28-2... | 18:15:33 | 01053437 | 45574 | Tool needs routine maintenance | Warning | 01022323 | 23222 |
| 2 | 04-28-2... | 18:13:29 | 01053437 | 45374 | Tie in tool | Information | 01022323 | 23145 |
| 1 | 04-28-2... | 18:05:19 | 01053437 | 45274 | Dispenser needs routine maintenance | Warning | 01022323 | 23123 |

AUTOMATIC TOOL WITH DATA INTERFACE

CROSS-REFERENCE TO RELATED APPLICATIONS

This application claims priority to and incorporates by reference in its entirety U.S. Provisional Application Ser. No. 60/573,916, entitled "Automatic Tool With Data Interface," filed on May 24, 2004.

FIELD OF THE INVENTION

This invention is directed generally to tools for manufacturing and is more specifically directed to manufacturing tools having data interfaces for allowing access to tool information.

BACKGROUND OF THE INVENTION

To improve manufacturing efficiency and prevent unnecessary downtime in manufacturing environments, it is important that manufacturing tools operate at high levels of reliability. To promote tool reliability, tool malfunctions should be quickly recognized and resolved. Ideally, malfunctions should be prevented by regular maintenance.

Tool maintenance and repair can be delayed for a number of reasons. For example, improper records of tool use may result in poor scheduling of preventive maintenance. The initial signs of a malfunction may be minor, and as a result a tool operator may not notice that a problem has arisen until the problem worsens. Even serious problems with a tool can go unresolved for lengthy periods if no reliable process exists to notify managers or repairmen that a tool needs attention.

There exists a need for systems and methods for use in manufacturing environments that promote the efficient use of manufacturing tools, including the creation and distribution of information about the manufacturing tools to maintenance and repair personnel.

SUMMARY OF THE INVENTION

According to one embodiment of the present invention, a manufacturing tool generates data regarding tool status.

According to another embodiment of the present application, a manufacturing tool is adapted to forward data regarding its status to a communication network. The communication network may include a database for storing tool data and a computer for accessing tool data forwarded by the tool or stored in the database. The computer may be adapted to poll the tool for data on command or at specified intervals.

Systems and methods according to some embodiments of the present invention involve the deployment of several tools with each tool generating data. Tool data from several different tools may be collected in a database and sorted for access by managers or maintenance personnel.

These and other embodiments will be further understood upon reference to the drawings and description, below.

BRIEF DESCRIPTION OF THE DRAWINGS

In the drawings:

FIG. 10 is another screen display showing tool information for a single hand tool;

FIG. 11 is another screen display showing tool information for multiple hand-tool-and-dispenser combinations;

FIG. 12 is another screen display showing tool information for multiple hand-tool-and-dispenser combinations.

DETAILED DESCRIPTION OF THE ILLUSTRATED EMBODIMENTS

Figure 1:
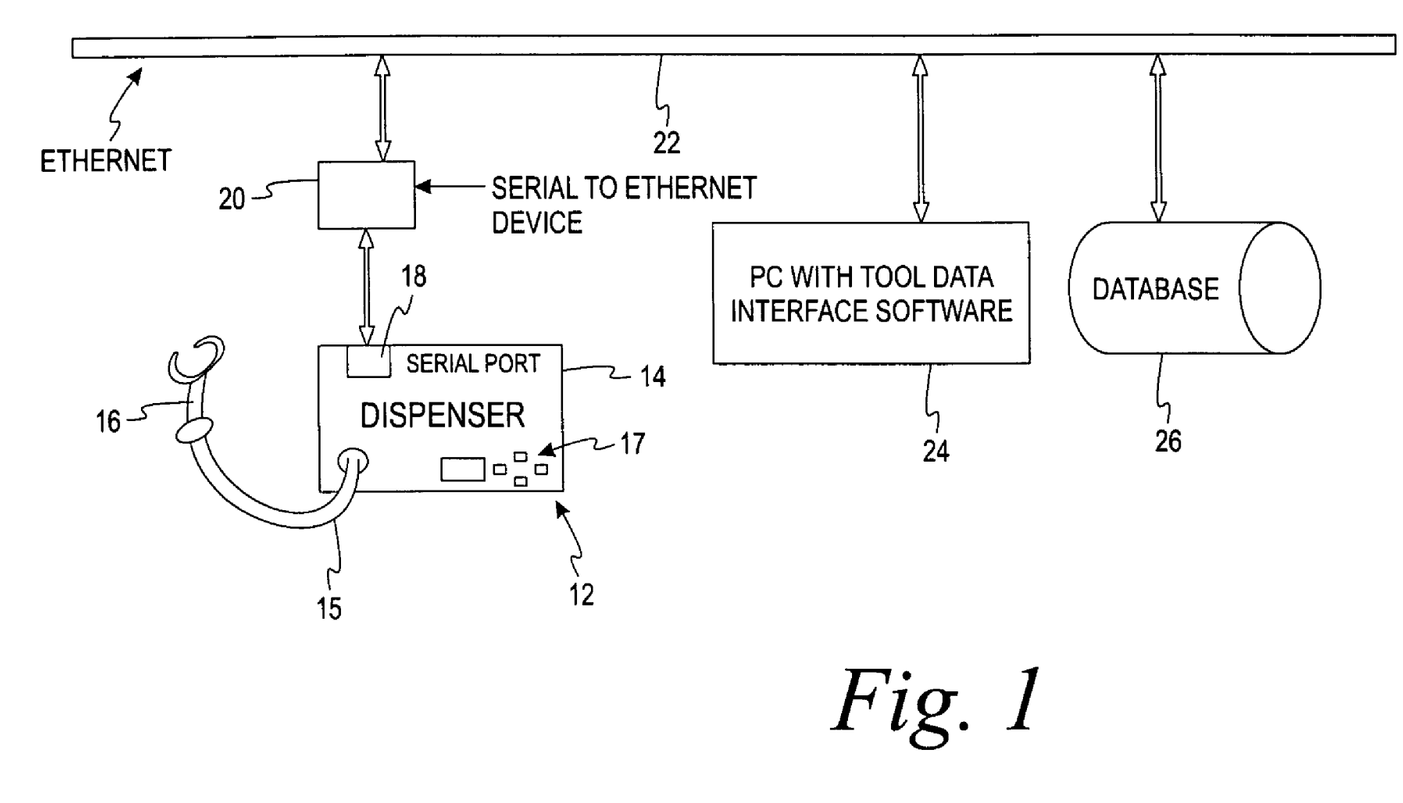
FIG. 1 is a block diagram showing a tool data transmission system according to one embodiment of the present invention.

Referring now to the drawings, and initially to FIG. 1, a tool data transmission system 10 is shown. A tool 12 is adapted to provide information regarding its status and operation. In the embodiment shown in FIG. 1, and in embodiments generally shown and described, the tool 12 comprises a dispenser 14 and a hand tool 16. In the discussion of embodiments of the present invention, the dispenser 14 is a cable tie dispenser and the hand tool 16 is a hand-held cable tie attachment tool. But it is to be understood that tools according to some embodiments of the present invention may include many other types of tools, including single-part and multiple-part tools. A connection conduit 15 between the dispenser 14 and the hand tool 16 allows the dispenser 14 to dispense cable ties to the hand tool 16 and also allows transmission of information regarding the hand tool 16 to the dispenser 14. A user interface 17 on the dispenser 14 allows users to input user information and control information into the dispenser 14 and to view information regarding the dispenser 14 and the hand tool 16.

The dispenser 14 is connected via a serial port 18 to a serial-to-Ethernet device 20, and in turn to an Ethernet network 22. Other types of network protocols may be used in a local area network, with corresponding changes in the network translation device 20. A computer 24 and a database 26 are also connected to the network 22. According to one embodiment, the database 26 is provided within the computer 24 and is not a separate component as shown in FIG. 1.

Information regarding the status and operation of the dispenser 14 and the hand tool 16 is sent from the serial port 18 to the network 22, and interpreted using tool data interface software provided on the computer 24. According to one embodiment, information is sent from the serial port 18 before the first cycle after powerup, after every complete cycle of the tool 12 and after every error of the tool 12. Information may also be sent from the tool 12 upon request from the computer 24. According to one embodiment, information is sent from the serial port after every error of the tool 12 and upon a request from the computer 24. Alternatively, information may be directly sent to the database 26 for access by the computer 24.

Information streams sent from the tool 12 comprise information on several tool parameters and statistics. For example, dispenser serial number, dispenser cycle count, dispenser cycle attempts, software revision, hand tool serial number, hand tool cycle count, last cycle time, and error messages are types of information that may be sent in data streams from the tool 12.

According to one embodiment, the serial-to-Ethernet device 20 converts the serial data stream to Ethernet packets. The computer 24 with the tool data interface software connects via Ethernet to the serial-to-Ethernet device 20 and receives the data stream from the tool 12. As described below, types of intermediary devices other than the serial-to-Ethernet device 20 may be used to connect the tool 12 to the network 22. The tool data interface software on the computer 24 interprets the data stream and places the data into the appropriate registers. Once in the appropriate registers, the data is then processed and sent via Ethernet to the database 26. The data is also processed and displayed on the computer 24. The display on the computer 24 contains information such as dispenser serial number, dispenser cycle count, software revision, hand tool serial number, hand tool cycle count, last cycle time, and last error. The interface of the computer 24 may also show the number of dispenser cycle attempts, dispenser completed cycles, and dispenser errors on a per-shift basis. The interface also shows all of the errors that have occurred on each shift and the connection status of the dispenser. The interface provided on the computer 24 also has the capability of remotely controlling a dispenser, if desired.

Once the data is in the database 26, the information can be processed as the user desires. Information related to efficiency and productivity can be obtained easily. In addition, errors can be analyzed for common themes.

Data sent by the dispenser 14 is not limited to parameters and statistics. With appropriate programming, self-monitoring and self-diagnostic messages can also be generated and sent to the data interface software and to a manufacturing management system database. Further, a serial-to-Ethernet device 20 may be provided with pre-installed data interface software, allowing interpretation of data from the tool 12 without requiring a separate computer.

According to one embodiment of the invention, the data interface between the tool 12 and the network 22 may be a Simple Network Management Protocol ("SNMP") proxy. An SNMP proxy is a device that allows a non-SNMP device, such as some embodiments of the tool 12, to appear on the Ethernet as an SNMP-enabled device. According to one embodiment, an Active Jack as disclosed in commonly owned pending patent application Ser. No. 10/439,716, entitled "Systems and Methods for Managing a Network" and incorporated herein by reference in its entirety, may be modified to act as an SNMP proxy for the tool 12.

The use of an SNMP proxy can significantly reduce the amount of network traffic, allow for more data to be available to data interface software, reduce cost, allow for the retrieval of information by any SNMP-capable "manager," and increase the number of tools that can be monitored to the number of IP addresses available on a user's network.

According to one embodiment, an Active Jack can interpret data streams from the tool 12 and place the data in appropriate object IDs within the Active Jack's Management Information Base (MIB). The PC 24 may retrieve the tool parameters and statistics using standard SNMP commands and place the information into a database. The database can reside either locally (on the same PC) or remotely (on a different PC). The data interface software can also send commands and information to the tool 12 by changing the values of certain object IDs within the MIB. The data interface software can present to the user the information that is in the database and provide some tools for data analysis. The use of SNMP proxies in some embodiments of the present invention allow for easy integration of tools into existing SNMP-compatible networks. According to some embodiments, the use of SNMP proxies allows the management and monitoring of tools without the need for specialized software.

Figure 2:
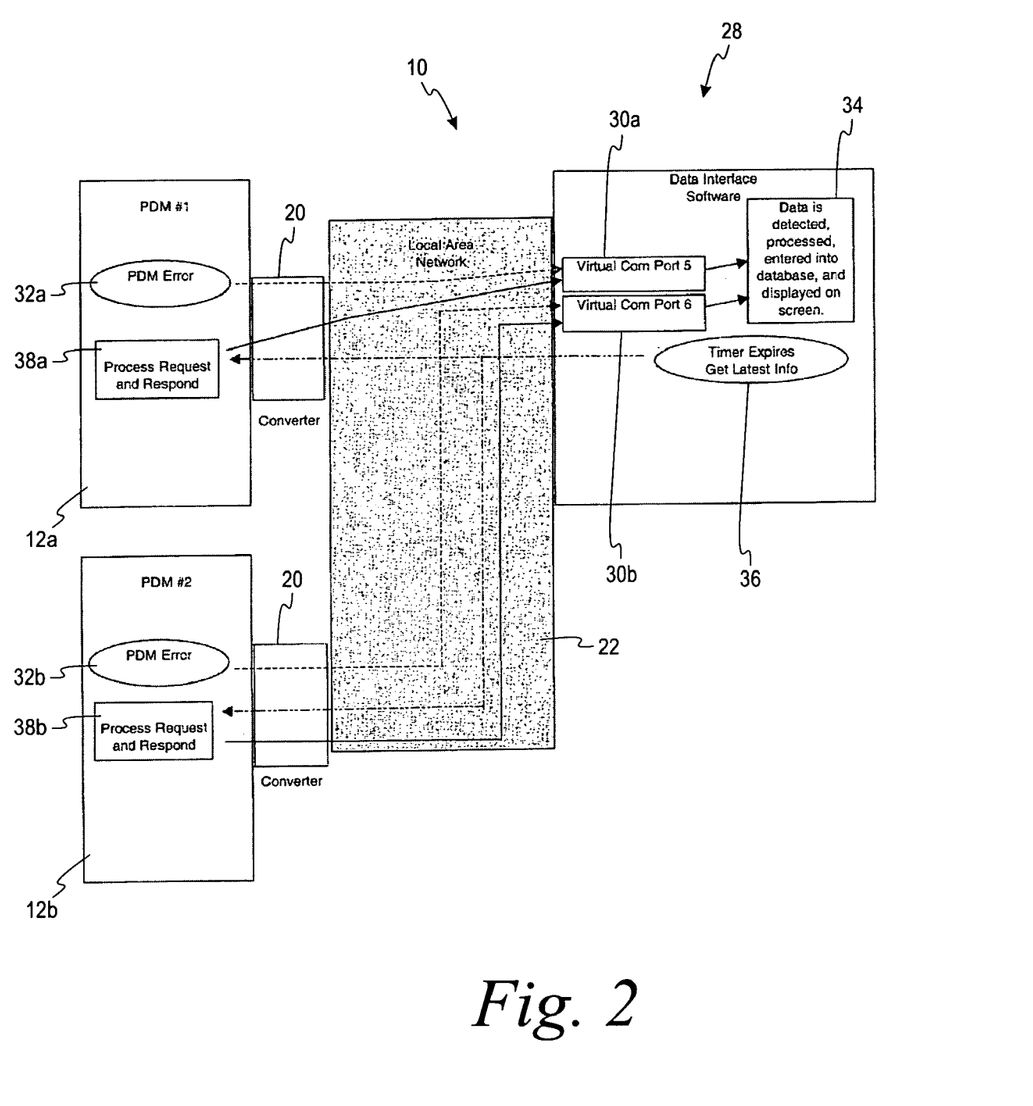
FIG. 2 is a block diagram showing a tool data transmission system according to another embodiment of the present invention.

Turning now to FIG. 2, another block diagram of a tool data transmission system 10 is shown. The block diagram of FIG. 2 shows data flows according to some embodiments of operations of the tool data transmission system 10. Two tools 12*a* and 12*b* (which are called "PDMs" in FIG. 2 and in other figures) are shown connected to the local area network 22 via converters 20 such as serial-to-Ethernet devices or SNMP proxies. In the embodiment shown in FIG. 2, the tools 12*a* and 12*b* are respectively associated with fifth and sixth virtual COM ports 30*a* and 30*b* by the data interface software 28.

Two data transmission operations are shown in FIG. 2. In one operation, the tools 12*a* and 12*b* experience tool errors as shown at blocks 32*a* and 32*b*. Error information is sent from the first and second tools 12*a* and 12*b* respectively to the fifth and sixth virtual COM ports 30*a* and 30*b*. As shown at block 34, the data is detected, processed, entered into a database, and displayed on a screen.

In a second data transmission operation, a poll is issued by the data interface software 28. As shown at block 36, a timer expires in the data interface software 28, and the data interface software 28 requests the latest information from the tools 12*a* and 12*b*. The tools process the request and send the latest tool information as shown at blocks 38*a* and 38*b*. Again, as shown at block 34, the data is detected, processed, entered into a database, and displayed on a screen.

While FIG. 2 shows only two tools 12*a* and 12*b* connected to the tool data transmission system, it is to be understood that many more tools may be connected. For example, in one embodiment a single data interface software module is adapted to interface with 250 tools.

Several functions are enabled by certain embodiments of the present invention. For example, data from tools attached to the tool data transmission system may be filtered so that only relevant information is shown to a requester of information. For example, only error signals may be needed by a repair technician, and only regular maintenance signals may be needed by maintenance personnel. User interfaces provided on tools allow users to "log in" with password information when they begin using tools, so that errors, efficiency information, and other information about the tools can be tracked on a per-user basis. Such an operation can ensure that tools are only operative when a qualified user is logged in, and can alert system administrators to attempted unauthorized use of a tool. Information may be delivered from the tools at various times such as at specific time intervals, in response to individual polling requests, or in response to operator changes. Standard preventive maintenance intervals may be programmed into the tools or into the data interface software so that "maintenance needed" signals are generated after a certain number of cycles. In some embodiments, an electronic maintenance log book is provided to allow storage of detailed maintenance records for each tool. Email operation may also be enabled, in which data interface software or individual tools are adapted to notify key personnel by email if errors occur or if maintenance is needed. A similar operation enables the automatic ordering of replacement parts if an error condition indicates that a specific part is needed, for example by providing direct access between tools or data interface software with equipment ordering systems.

According to an alternative embodiment, serial-only communication may be used between tools, computer systems, and databases. Standard networking schemes, such as Ethernet, are preferred because this allows the use of existing network infrastructure for the transmission of tool data.

Figure 3:
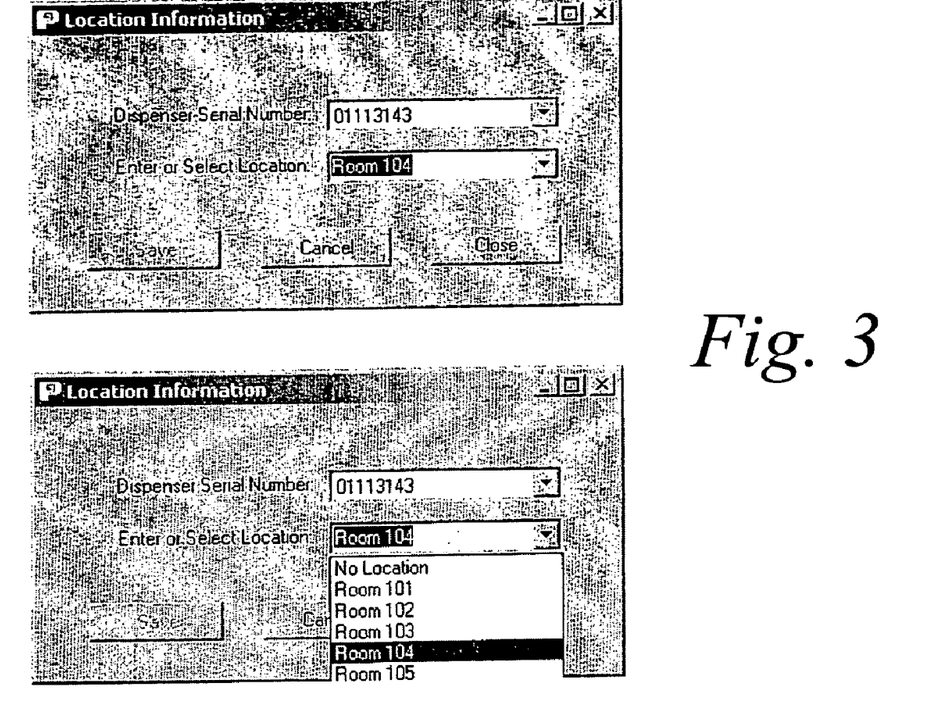
FIG. 3 is a screen display showing the insertion of location information regarding a tool.

Turning now to FIG. 3, a screen display shows an interface enabling an operator to associate particular dispensers with location information within data interface software. Following such an association, maintenance or repair personnel may be more easily told where their assistance is needed.

Figure 4:
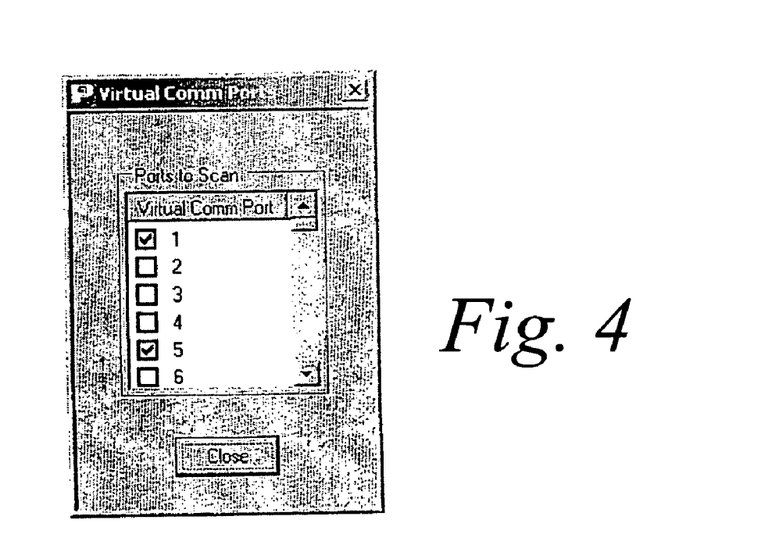
FIG. 4 is a screen display showing the selection of virtual COM ports for scanning.

Tools may be associated with virtual COM ports in a data interface system. FIG. 4 shows a screen display of an interface allowing an operator to scan specific virtual COM ports for tool information.

Figure 5:
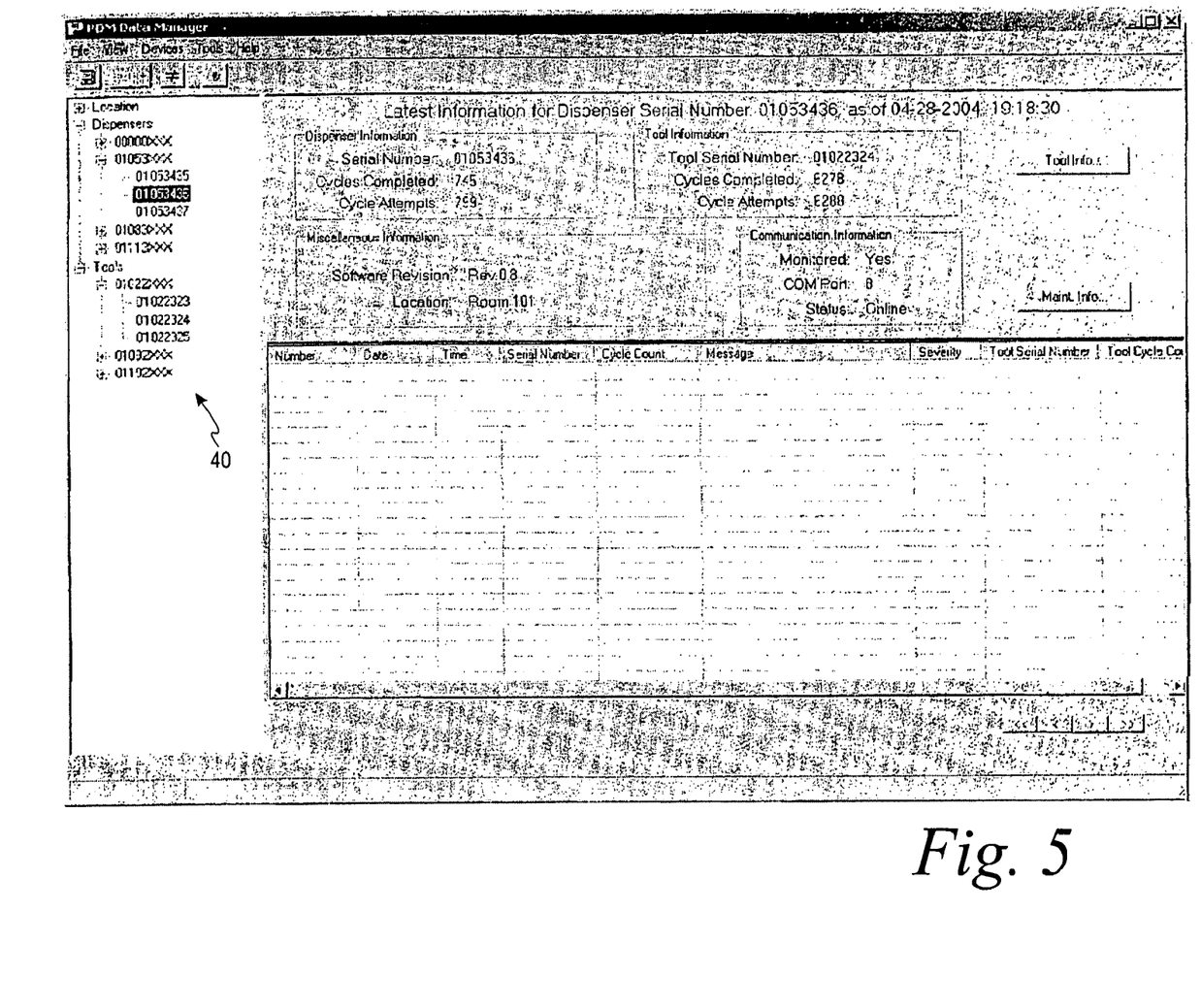
FIG. 5 is a screen display showing tool information for a single dispenser.

FIGS. 5–13 show a variety of screen displays. FIG. 5 is a screen display showing the latest information for a particular dispenser. Displayed information includes: the serial number of the dispenser, the number of cycles completed by the dispenser, the number of cycle attempts by the dispenser, the serial number of the hand tool connected to the dispenser, the number of cycles completed by the hand tool, and the number of cycle attempts by the hand tool. In addition, the software revision of the dispenser, the location of the dispenser, and communication information such as the monitoring status of the dispenser, the virtual COM port assigned to the dispenser, and the operational status of the dispenser are shown. A unit selection display 40 of the graphical user interface allows an operator to select dispensers or tools about which the operator requires information.

Figure 6:
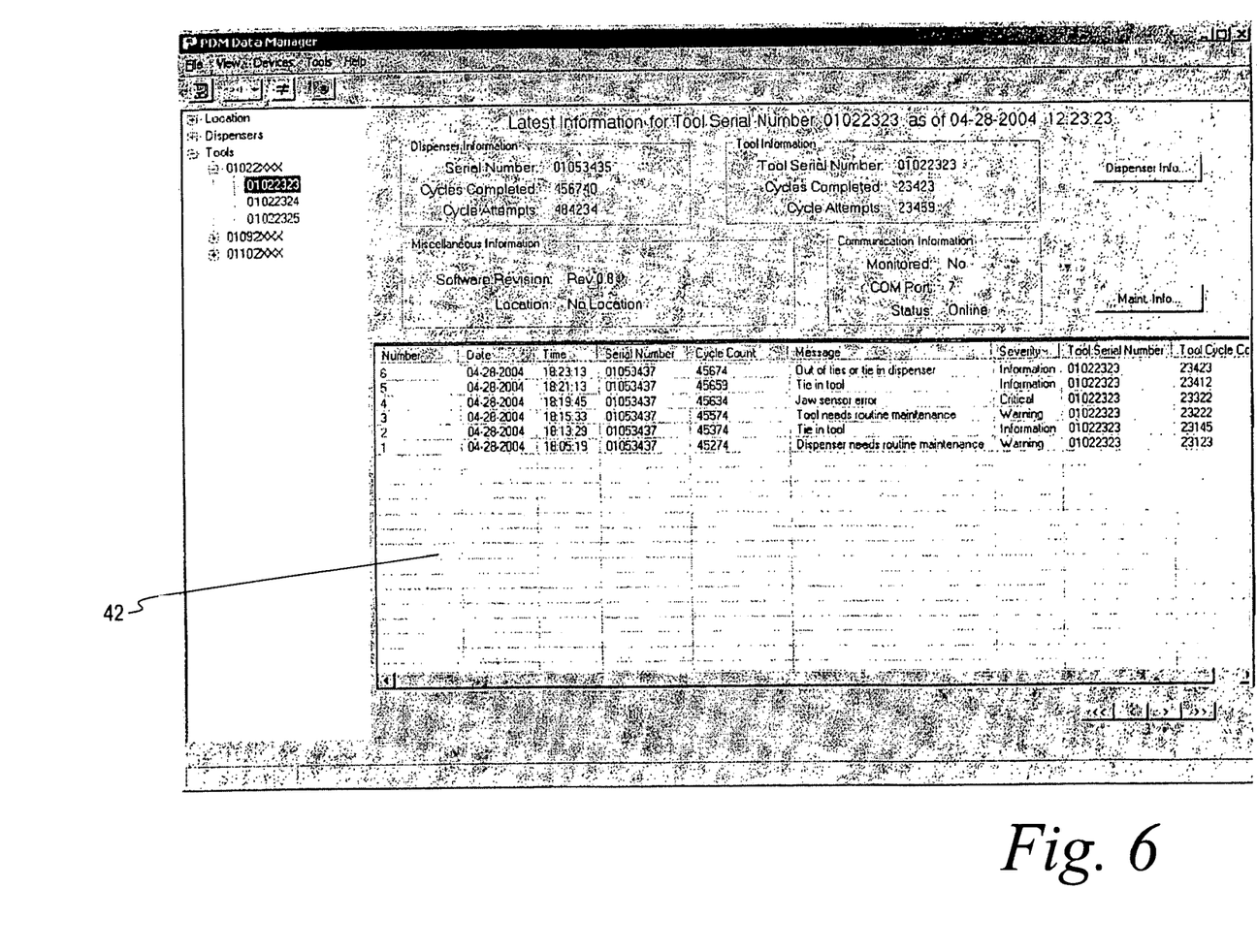
FIG. 6 is a screen display showing tool information for a single hand tool.

Turning to FIG. 6, a screen display showing the latest information for a particular hand tool is illustrated. A detailed report display 42 displays detailed information about the hand tool, including listed report numbers, dates and times of reports, the dispenser's serial number, the cycle count of the dispenser, the message of the report, the severity of the report, the hand tool's serial number, and the hand tool's cycle count. In the cable tie tool embodiment shown, report messages include that the dispenser is out of ties, that there is a tie in the tool, an error of the jaw sensor, a message that the tool needs routine maintenance, and notification that the dispenser needs routine maintenance.

Figure 7:
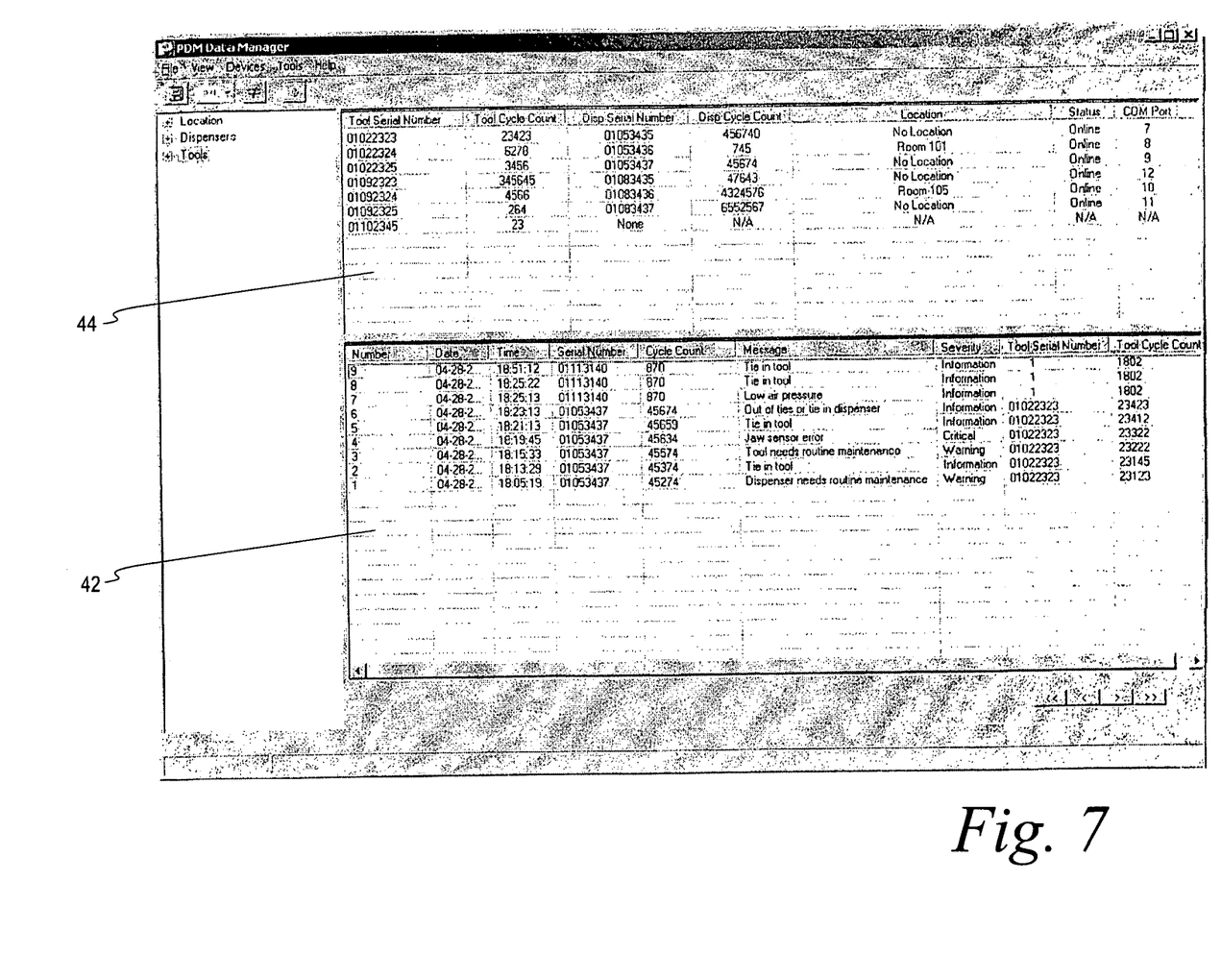
FIG. 7 is a screen display showing tool information for multiple hand-tool-and-dispenser combinations.

FIG. 7 is a screen display showing tool information for multiple tools, including multiple hand tools connected to multiple dispensers. A unit list display 44 shows information from multiple hand tools connected to multiple dispensers, including cycle counts for listed hand tools and dispensers, the locations of tools and dispensers if known, tool and dispenser status, and the virtual COM ports associated with the tools and dispensers. The detailed report display 42 contains detailed information about specific hand tools or dispensers, depending on what information the operator wishes to view. An additional message shown in FIG. 7 is a notification of low air pressure in the tool.

Figure 8:
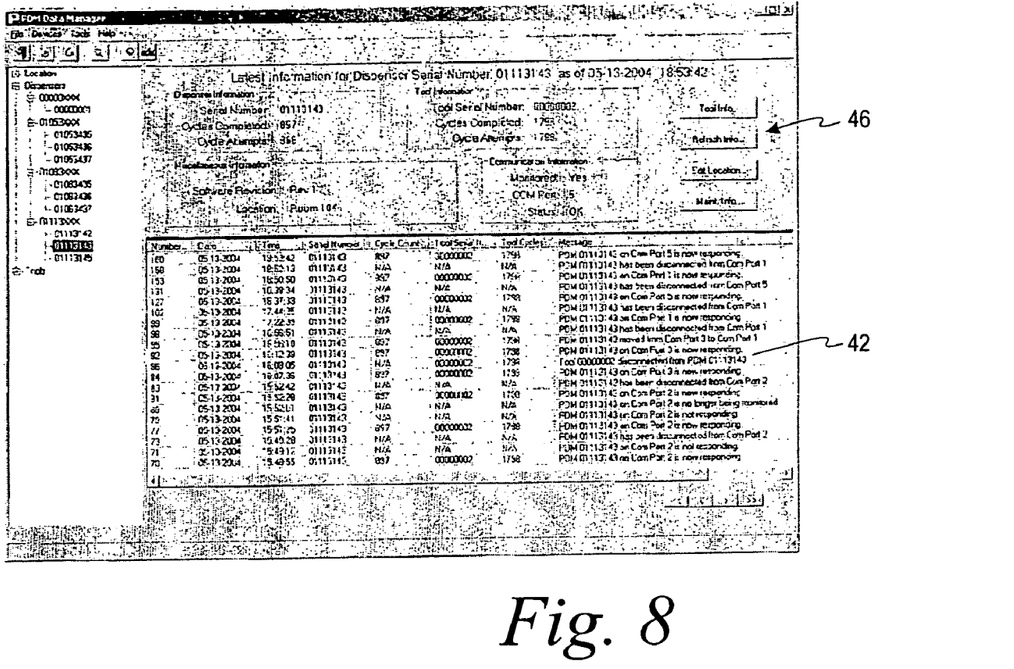
FIG. 8 is another screen display showing tool information for a single dispenser.

FIG. 8 is another screen display showing the latest information for a particular dispenser, in which the detailed report display 42 reflects movement of the dispenser to different locations or reassignment of the dispenser to different virtual COM ports. Tool connection status is also shown in the detailed report display 42. Interface buttons 46 of the graphical user interface allow a user to review tool information, refresh tool information, edit tool locations, and review maintenance information about specific tools.

Figure 9:
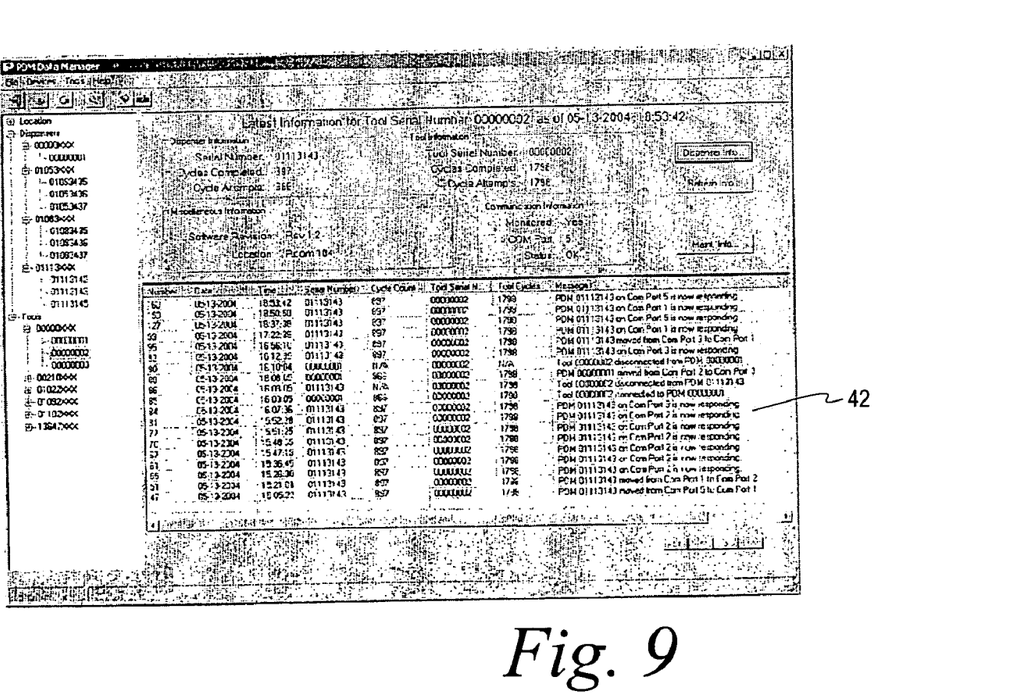
FIG. 9 is another screen display showing tool information for a single hand tool.

FIG. 9 is another screen display showing the latest information for a particular hand tool, in which the detailed report display 42 reflects movement of the hand tool and an associated dispenser to different locations or reassignment of the hand tool's associated dispenser to different COM ports. Tool connection status is also shown in the detailed report display 42.

FIG. 10 is another screen display showing the latest information for a particular hand tool. The detailed report display 42 reflects connection of the hand tool to different dispensers. Additional messages shown in the detailed report display 42 reflect that at one point a tie is stuck in an exit sensor of the hand tool, and that a cover is open without a tie being loaded.

FIGS. 11 and 12 are additional screen displays showing tool information for multiple tools, including multiple hand tools connected to multiple dispensers. In FIG. 11 the unit list display 44 has been organized according to tool location, and in FIG. 12 the unit list display 44 has been organized according to dispenser serial number. In both displays, tool connection information is shown in the detailed report displays 42.

Figure 13:
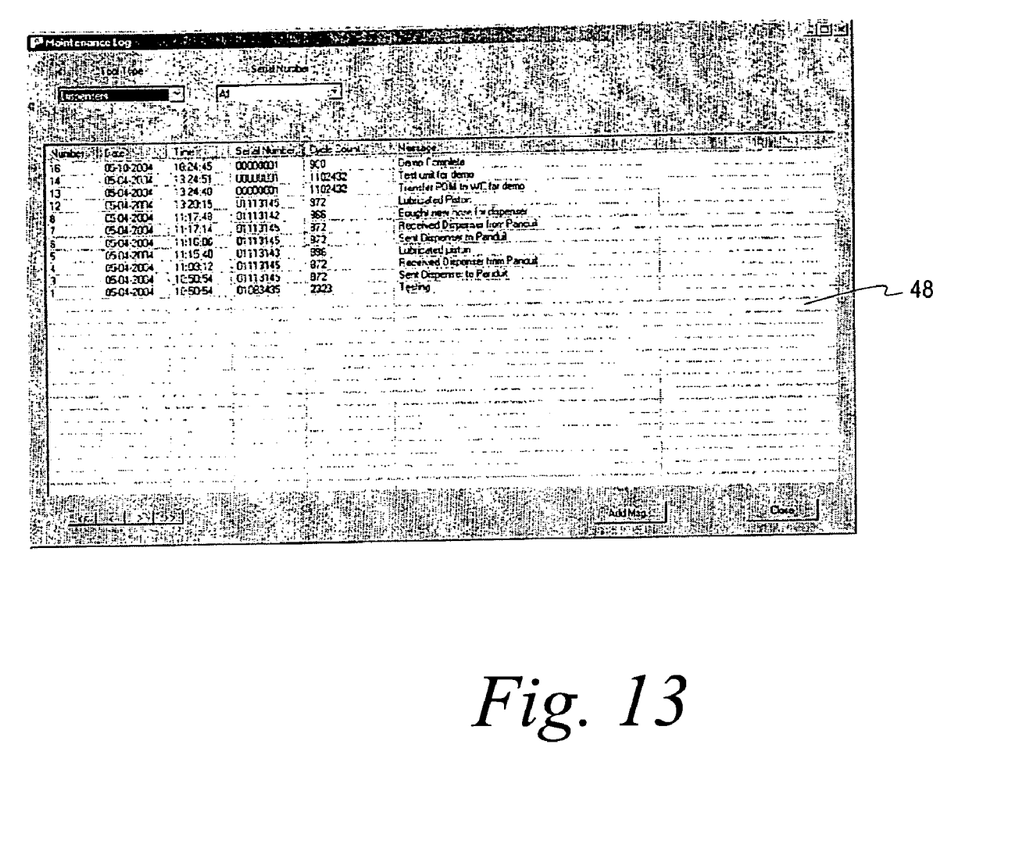
FIG. 13 is a screen display showing a tool maintenance log.

FIG. 13 is a screen display showing a maintenance log display 48. Using the maintenance log display 48, maintenance personnel input maintenance information, including information on particular maintenance operations or repairs performed on specific tools. Information such as time and date information to track when tools have been sent out for repairs or returned may be input.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A system for managing cable tie tools in a manufacturing environment comprising:
   at least one cable tie tool having a dispenser and a hand tool and adapted to provide tool information regarding its status and operation, said cable tie tool having a data port for outputting said tool information;
   a communications network;
   an intermediary device for connecting the data port of the cable tie tool to the communications network;
   a computer attached for the communications network and adapted to communicate with the intermediary device; and
   a database for storing said tool information and providing said computer with access to said tool information.

2. The system of claim 1 wherein said intermediary device comprises a serial-to-Ethernet device.

3. The system of claim 1 wherein said intermediary device comprises an SNMP proxy.

4. The system of claim 1 wherein said tool information comprises error information, maintenance information, and operation information.

5. The system of claim 4 wherein said error information comprises information selected from the list consisting of an error message that a dispenser is out of cable ties and a cable tie tool jaw sensor error message.

6. The system of claim 5 wherein said maintenance information comprises information selected from the group consisting of a message that the dispenser needs routine maintenance and a message that the hand tool needs routine maintenance.

7. The system of claim 5 wherein said operation information comprises information selected from the group consisting of: the serial number of the dispenser, the number of cycles completed by the dispenser, the number of cycles attempted by the dispenser, the serial number of the hand tool, the number of cycles completed by the hand tool, and the number of cycles attempted by the hand tool.

8. The system of claim 4 wherein said computer is provided with a user interface and is adapted to send said error information to a repair technician via email and to send maintenance information to a maintenance technician via email.

9. The system of claim 4 further comprising an ordering system and wherein said computer is adapted to automatically order replacement parts via said ordering system in response to receipt of specific types of said error information.

10. The system of claim 1 wherein said tool information comprises tool location information.

11. The system of claim 1 wherein said tool is provided with a user interface allowing users to log in for tool use, and wherein at least some of said tool information is associated with specific users within said database.

12. The system of claim 1 wherein said database is provided within said computer.

13. The system of claim 1 wherein said intermediary device is an active jack.

14. A method of managing tools in a manufacturing environment comprising:
   providing a communications network having at least one computer with a visual display and at least one database connected to said communications network;
   providing at least one cable tie tool, said cable tie tool having a data port for outputting tool information to said communications network through an intermediary device;
   accepting said tool information from said intermediary device at said computer; and
   displaying said tool information at said computer.

15. The method of claim 14 wherein said tool information comprises error information, maintenance information, and operation information.

16. The method of claim 15 wherein said error information comprises information selected from the list consisting of an error message that a dispenser is out of cable ties and a cable tie tool jaw sensor error message.

17. The method of claim 15 wherein said maintenance information comprises information selected from the group consisting of: a message that the dispenser needs routine maintenance and a message that the hand tool needs routine maintenance.

18. The method of claim 15 wherein said operation information comprises information selected from the group consisting of: the serial number of the dispenser, the number of cycles completed by the dispenser, the number of cycles attempted by the dispenser, the serial number of the hand tool, the number of cycles completed by the hand tool, and the number of cycles attempted by the hand tool.

19. The method of claim 14 wherein said tool information comprises tool location information.

20. The method of claim 14 wherein said intermediary device comprises an SNMP proxy.

21. The method of claim 14 wherein said cable tie tool comprises a dispenser and a hand tool.

* * * * *